INVENTORS
GUY PIERRE LAFON
JEAN-PIERRE CAILLEY

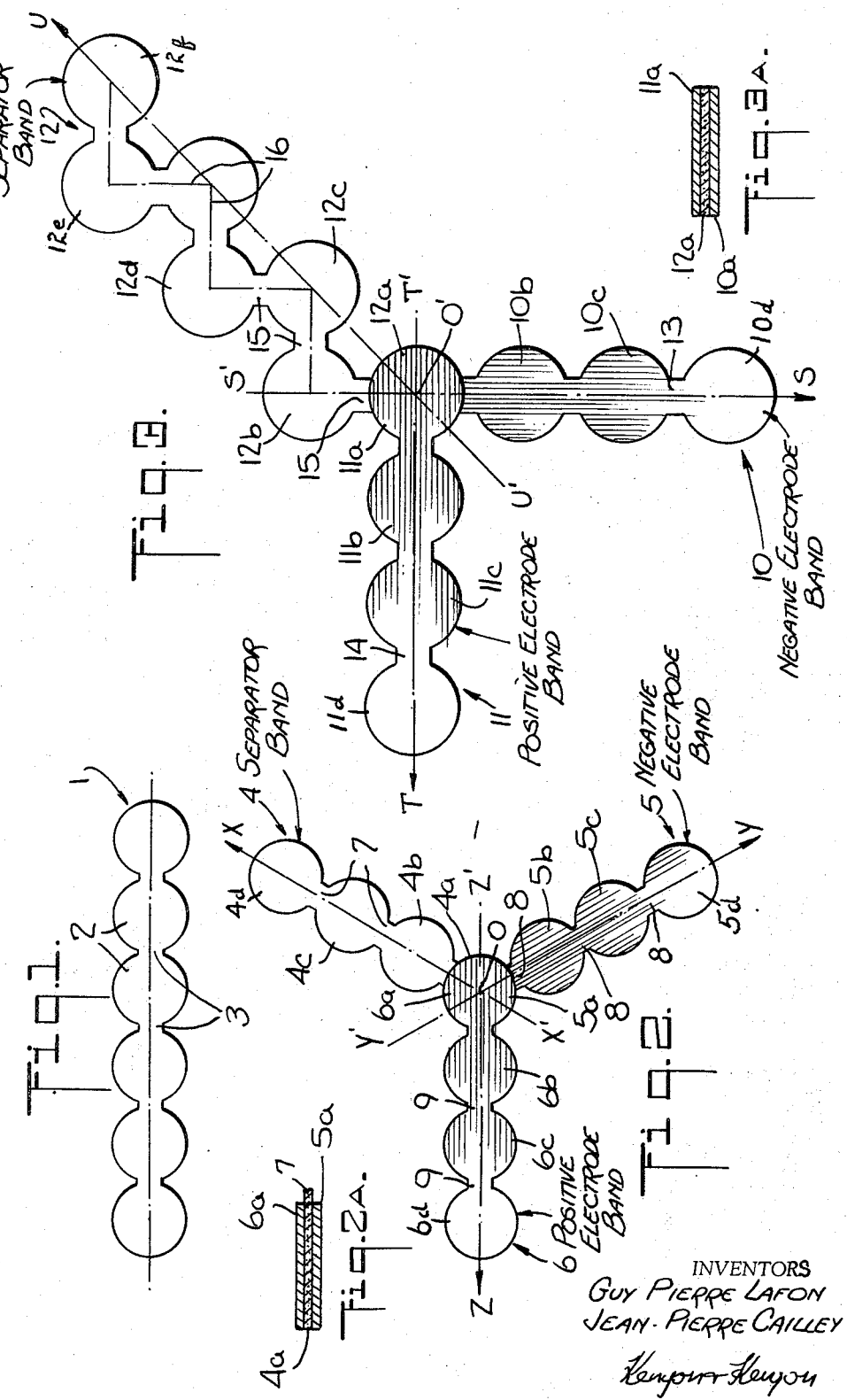

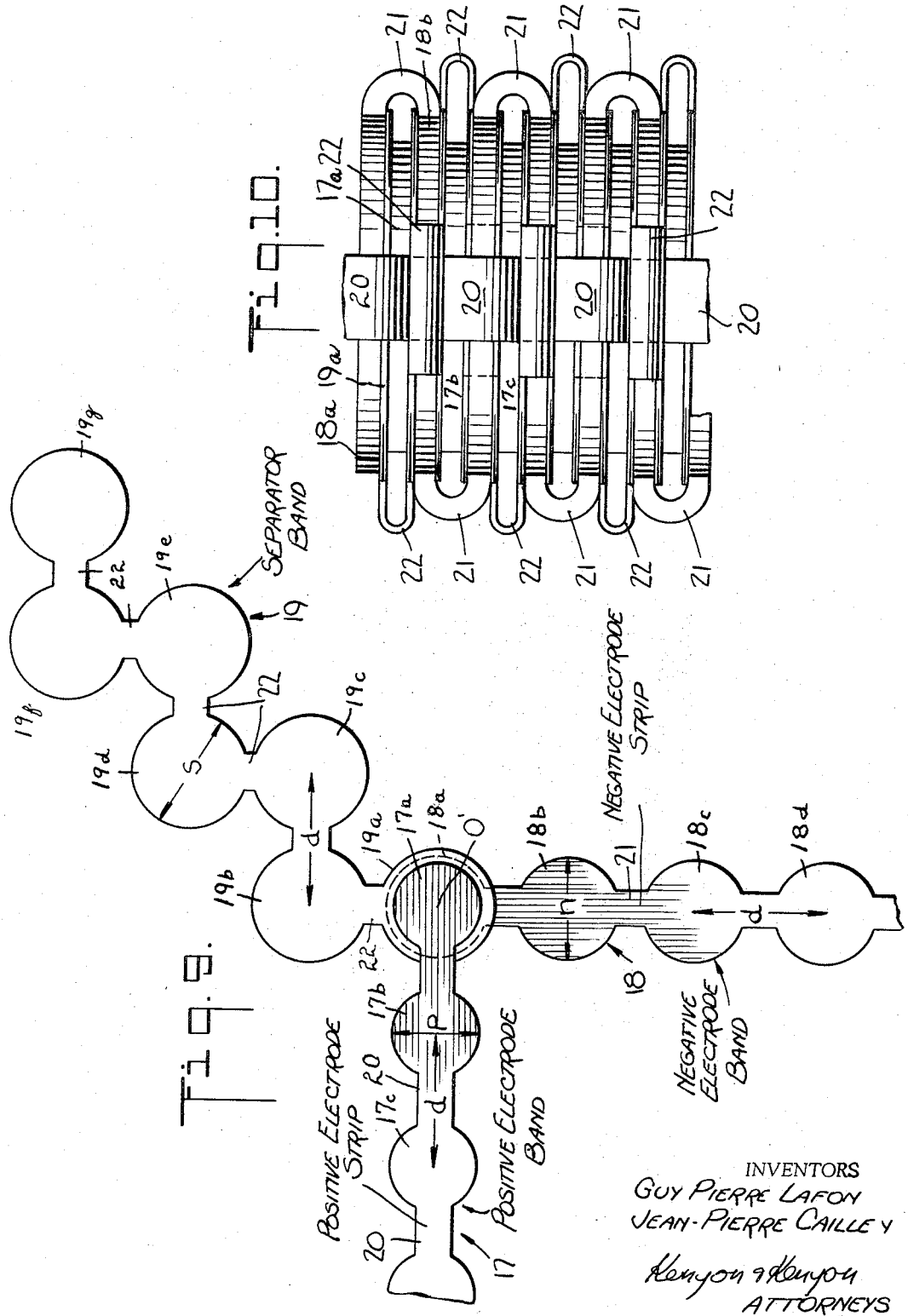

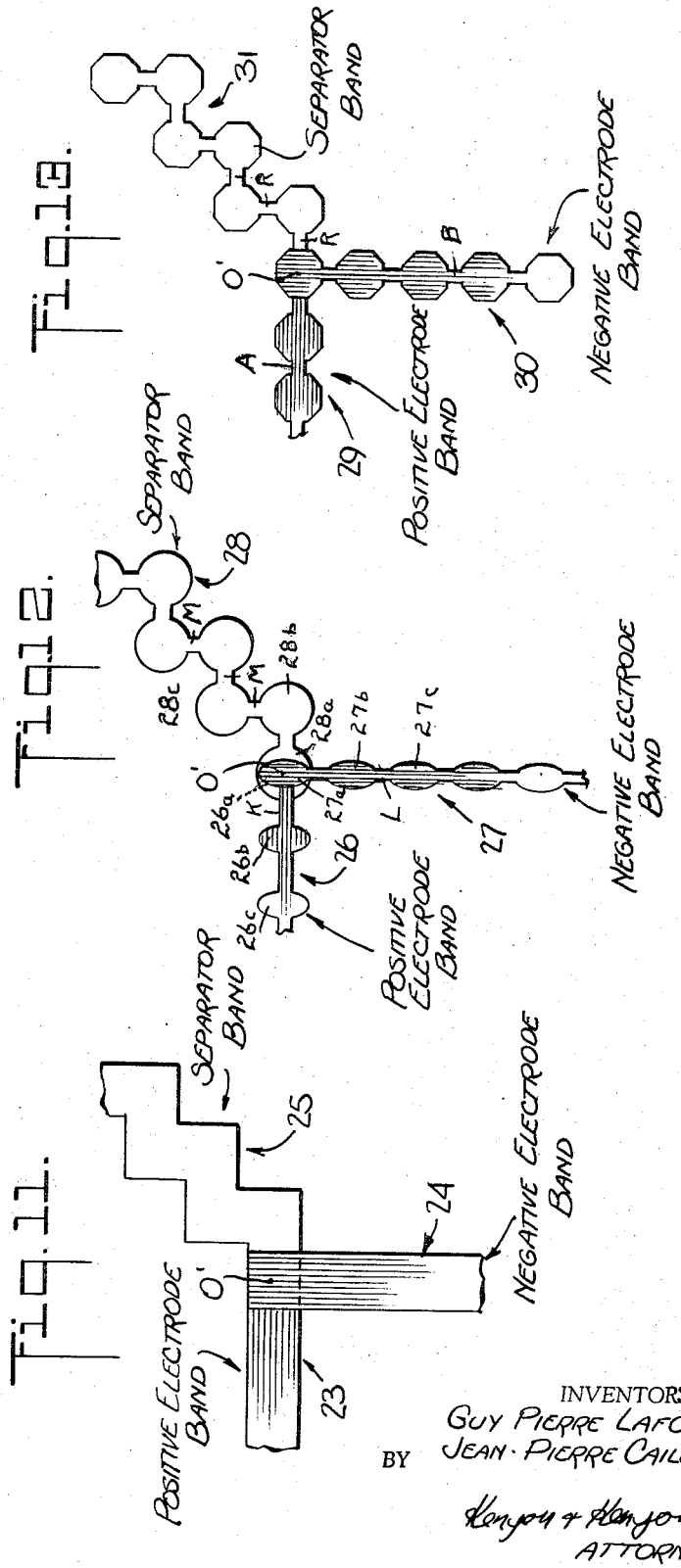

United States Patent Office 3,345,211
Patented Oct. 3, 1967

3,345,211
CONTINUOUS PROCESS OF MANUFACTURING A STACK OF ELEMENTS FOR USE IN AN ELECTRIC CELL
Guy Pierre Lafon, Bordeaux, and Jean-Pierre Cailley, Ambares, France, assignors to Societe des Accumulateurs Fixes et de Traction (Societe Anonyme), Romainville, France, a French company
Filed July 16, 1964, Ser. No. 383,129
Claims priority, application France, July 17, 1963, 941,811; June 4, 1964, 977,110
9 Claims. (Cl. 136—6)

This invention relates to storage or electrolytic cells and to a continuous process for their manufacture.

An essential object of the present invention is the provision of a continuous process for making a stack, which can more especially be used for assembling electric cell electrodes, said stack being constituted by discs, parts or plates of a flat shape and of different kinds, said kinds being alternated, the discs, parts or plates of the same kind forming a continuous band made of successive similar discs or parts linked together by an integral strip or by a strap, said strips or straps being folded as the pile is being made.

In the U.S. Patent No. 2,971,999, of Feb. 14, 1961 the construction of a cell, the positive and negative electrode bands of which are constituted by piled up discs 10+ and 10− is described. For each electrode, said discs 10+ and 10− representatively are part of a band constituted by two or more discs 10+ and 10− respectively linked together by an integral conductive strip 14+ and 14− respectively. Said two electrode bands are then folded accordion-wise and interleaved together so that they constitute an alternate stack of positive electrodes 10+ and negative electrodes 10−. According to an embodiment, separators made of separate discs 17 are interposed between said electrodes 10+ and 10−. The assembly provides a pile or battery or cell.

This arrangement is satisfactory as long as the number of electrodes of the same polarity is not too high in the pile or battery or cell.

The problem which then comes up is, therefore, to constitute a pile, battery or cell by folding continuous electrode and separator bands for any number of discs, parts or plates forming the respective bands.

The process according to the present invention is more especially remarkable, in that the said continuous bands are laid flat and then positioned or disposed in convergent or star-like directions, the initial discs or parts of each band being piled up in the desired order at a spot chosen for commencement of the piling-up operation.

According to another characteristic or feature of the invention, at least one of the said bands (preferably that one intended for use as the separator) has the centers of its discs or parts staggered so that they are disposed on a zig-zag line.

According to another characteristic or feature of the invention, in the case of a stack intended for use as a storage or an electrolytic cell, the band with staggered discs or parts constitutes the separator whereas in the bands whose discs or parts constitute the electrodes the centers of their discs or parts are disposed in substantially straight lines.

According to still another, feature or characteristic of the invention, the two bands, which constitute e.g. the positive and negative electrodes provide two of the three rays of the above-mentioned star and are disposed at an angle of about 90° relative to each other.

According to another feature or characteristic of the invention, the band which provides the separators (zig-zag lined band) constitutes the third ray of the said star and has its main direction substantially parallel to the bisector of the angle made by the two other rays of the said star and is disposed at an angle equal to 135° of said two other rays.

According to another feature or characteristic of the invention, in the case of storage cell electrodes, the negative electrode band which has the general shape of a straight strip, each disc, part or plate has a width $n$; each disc, part or plate constituting the separator band has a width $s$, and each disc, part or plate of the positive electrode band has a width $p$. The dimensions $n$, $s$, $p$ are related by the inequality $$s \geq n \geq p$$

and the distance $d$ between any two centers of adjacent parts or discs of any one of the electrode or separator bands is greater than $s$.

Another object of the invention is the provision of a separator for storage or electrolytic cells having the shape of a continuous band made up of successive similar plates, parts or discs linked together by a common part or strip more especially remarkable in that the said plates, parts or discs are disposed in a staggered way so that their centers are situated on a zig-zag line.

According to another feature or characteristic of the invention, the said zig-zag line is made of practically orthogonal segments substantially equal two by two, the middle points of said segments being substantially aligned.

According to anothher feature or characteristic of the invention, all the said segments have substantially the same length.

Still other objects of the invention are the electrolytic, primary or secondary cells obtained by the process and comprising the separator according to the invention.

Other objects and features of the invention will become apparent from the following description and the accompanying drawings forming a part hereof and given as examples.

In the drawings:

FIG. 1 shows a continuous band made of discs or parts linked together by joining strips and which may be used to practice the invention;

FIG. 2 shows three continuous bands similar to the one shown on FIG. 1 and disposed in view of their use according to the invention;

FIG. 2a is a fragmentary section taken along line X–X' of FIG. 2;

FIG. 3 shows three continuous bands disposed in a star-like shape, two of them being straight and the third one in a zig-zag line according to the invention;

FIG. 3a is a fragmentary section taken along line U–U' of FIG. 3;

FIG. 9 shows a particular embodiment;

FIG. 10 shows a sectional view of the pile, battery or cell made from the bands shown in FIGURE 9; and FIGS. 11, 12 and 13 show three shapes of continuous bands such that a pile battery or cell may be made from them according to the invention.

Figure 4:
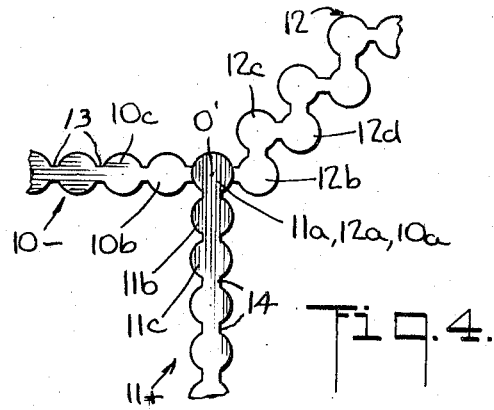
FIGS. 4, 5, 6, 7 and 8 show five successive stages of the piling operation according to the invention.

The problem consists in making up a pile, battery or cell of the parts or discs while alternating the disc kinds, the discs of one kind being arranged in a continuous band. Such a band 1 is seen in FIG. 1. It is constituted by parts or discs 2 linked together by common parts or strips 3. Such discs belonging to different continuous bands are to be superposed by successivily folding up said bands.

In order to constitute such a pile, one end disc or part of each band must be placed at the location where the said pile is to be made.

Three continuous straight bands respectively referenced 4, 5 and 6 are seen in FIG. 2, disposed in a star-like manner, the axes X'X, Y'Y and Z'Z being disposed at 120° angles with respect to each other.

As seen in FIGS. 2 and 2a, the first discs or parts 4a, 5a and 6a of these three bands 4, 5 and 6 are piled up at point O. This piling up may be made in any order. As an example, the first discs 4a of band 4 may cover the first disc 5a of band 5 itself and be covered by the first disc 6a of band 6.

These three continuous bands are shaped similarly to the band 1 shown in FIG. 1 and their successive parts or discs respectively referenced 4a, 4b, 4c and 4d; 5a, 5b, 5c and 5d and 6a, 6b, 6c and 6d are linked together respectively by integral strips 7, 8 and 9.

If the pile thus begun is to be continued from the three initial discs 4a, 5a and 6a, e.g. by putting a new disc 5b belonging to band 5, band 5 is to be folded around strip 8 located between discs 5a and 5b.

Thus discs 5b is put on the already made pile.

However, it may be seen that band 5 which had the general direction OY now has the OY' direction. It is then comprised within the angle OX, OZ which is substantially equal to 120° and which is made by the initial directions of the other two bands 4 and 6.

In order to avoid having the discs of the three bands 4, 5 and 6 short circuit during their accordion-like folding, it is necessary to take some precautions. The respective discs of bands 4, 5 and 6 may be given different diameters or shapes, or else the respective discs of strips 7, 8 and 9 may be given relatively different lengths.

Such accordion-like folding of the respective discs of said continuous bands 4, 5 and 6 may render the manufacture of a pile, battery or cell rather easy in some instances.

When, however, for any reason these special shapes and lengths are not desirable, other arrangements must be resorted to.

For example, the operation may then be conducted as seen in FIGS. 3 and 3a.

Said FIGURE 3 represents three continuous bands 10, 11 and 12 also according to the invention, which would solve the problem. The various discs or parts 10a, 10b, 10c and 10d, 11a, 11b, 11c and 11d and 12a, 12b, 12c, 12d, 12e, 12f of these respective bands 10, 11 and 12 respectively linked by integral strips 13, 14 and 15. It may immediately be seen in this figure that continuous bands 10 and 11 are straight ones of a structure similar to that of the band 1 of FIG. 1 or bands 4, 5 and 6 of FIG. 2. On the contrary, band 12 is constituted by discs or parts disposed in a staggered way. The line of the centers of the discs constituting band 12, i.e. respectively discs 12a, 12b, 12c, 12d, 12e and 12f is a zig-zag line. In the example shown in FIG. 3, such zig-zag line is constituted by segments 16 which are all substantially equal to each other. Such segments 16 are orthogonal. It is well understood that there may be cases where a slightly different disposition could be desirable.

Axes S'S, T'T, U'U which represent the respective directions of bands 10, 11 and 12 are shown in this FIG. 3. Said three axes S'S, T'T and U'U obviously intersect at point O' which is the center of the pile already made by the three first discs 10a, 12a and 11a of the three bands, 10, 12 and 11 as seen in FIG. 3a.

It will presently be seen that in such conditions, if the value of angle SO'T is chosen as 90° and if a direction O'U is substantially identical to that of the bisector of said angle SO'T, a pile may be constituted by the various discs or parts belonging to respective bands 10, 11 and 12 without risking overlapping of said bands, provided that a definite order is followed, i.e. that bands 10, 11 and 12 are respectively superposed in such a way that the zig-zag band 12 has the centers of the first discs or parts 12a in alignment with the direction of the straight band situated immediately under it (viz. 10 in FIG. 3). On the contrary, the line of the centers of discs 12a, 12b should be perpendicular to the direction of the straight band immediately above it (viz. 11 in FIG. 3).

With such a disposition of the three bands thus constituted, during the following successive operations of accordion-like folding, none of these bands will enter the angle (less than 180°) made by the other two, and as a consequence an overlapping of the two folding bands is not likely to occur if between each disc or part belonging to a straight band 10 or 11, a disc or part of a staggered band 12 is interposed and, if, in addition, between two consecutive discs of the same straight bands 10 or 11 a disc of the other straight band 10 or 11 is interposed.

FIGURE 4 shows on a smaller scale three bands 10, 11 and 12 identical or similar to those depicted in FIG. 3. FIGS. 5, 6, 7 and 8 respectively on the same scale show four successive stages of the folding operation of these various bands corresponding to the piling up of four further discs belonging to the said three bands.

Figure 5:
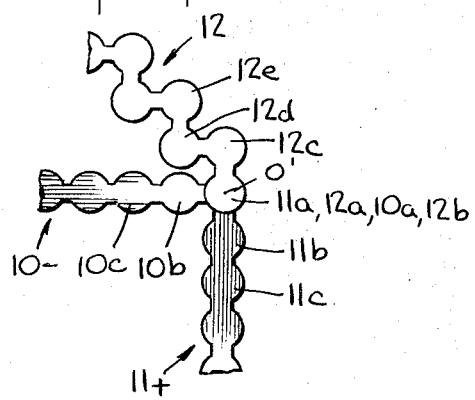

More precisely, FIG. 4 shows the three bands 10, 11 and 12, the first three discs or parts 11a, 12a and 10a which cover each other in this order at point O'. As a first move, by folding the band 12 around the strip 15 common to discs 12a and 12b a pile of successive discs or parts 11a, 12a, 10a, 12b is obtained as shown in FIG. 5. During this folding band 12 does not enter the angle made by the other bands 10 and 11.

Figure 6:
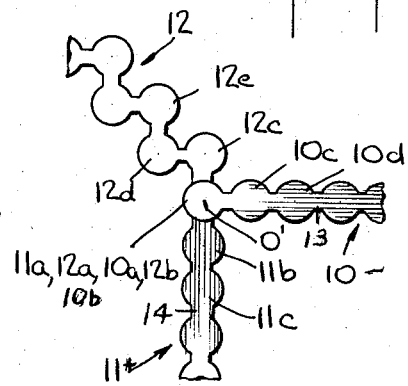

Then, as a second move band 10 is folded and, as shown in FIG. 6, a pile of five successive discs or parts 11a, 12a, 10a, 12b and 10b is obtained. As may be seen in said FIG. 6, there is still no risk of overlapping by the various bands, 10, 11 and 12.

Figure 7:
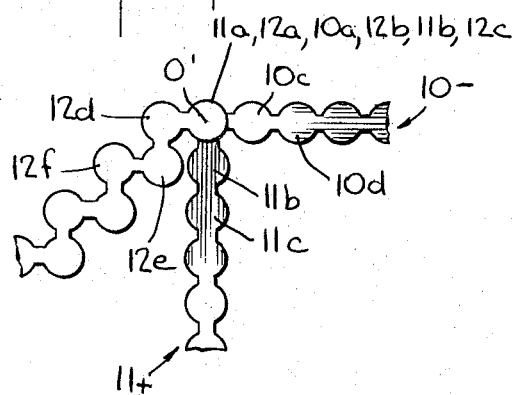

FIG. 7 shows a further stage of the folding, adding disc 12c to the already constituted pile.

Figure 8:
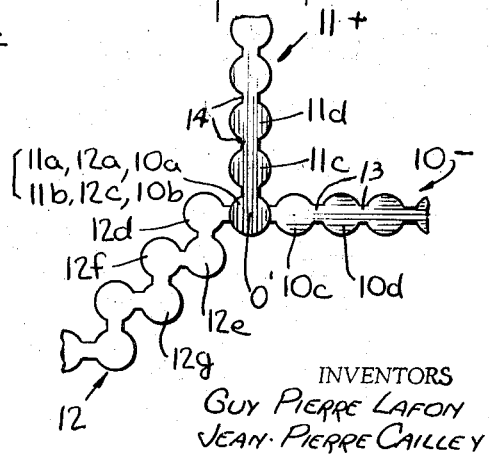

Similarly, FIG. 8 shows the following stage adding disc or part 11b to the already constituted pile.

Thus, it may be seen that in these various stages of accordion-like folding of bands 10, 11 and 12, there is not at any moment, any risk of their discs overlapping or short-circuiting each other.

On the other hand, by comparing FIGS. 4 and 8 it may be seen that FIG. 8 can be deduced from FIG. 4 by a 180° rotation around point O' neglecting the additional stack of four discs or parts 12b, 10b, 12c, 11b. It may thus be seen that the successive folding of the said three bands, always in the stated order (i.e. such that a disc or part belonging to band 10 is always separated by a disc or part belonging to band 12 from a disc or part belonging to band 11), will always be possible in the stated conditions.

More especially, such stacking is particularly useful when bands 10 and 11 are electrode bands, respectively and band 12 is a separator band.

Storage batteries, electrolytic cells or piles may then be constructed from such stacks in a very simple manner. The various discs respectively having the same polarity are linked and connected together by their integral respective parts or strips 13 and 14 as hereinabove shown.

FIG. 9 shows another embodiment of a method of constructing a pile according to the invention. This figure shows three continuous bands respectively referenced 17, 18 and 19. Band 17 is a straight band constituted by discs 17a, 17b, 17c, 17d linked together by integral strips or parts 20. Band 18 is a straight band constituted by discs 18a, 18b, 18c, 18d linked together respectively by integral strips or parts 21. Band 19 is constituted by several discs 19a, 19b, 19c, 19d, 19e, 19f, 19g arranged in a staggered manner and linked together respectively by integral parts or strips 22.

As shown in this FIGURE 9, the bands 17, 18 and 19 play the same parts as already described bands 10, 11 and 12. It is merely the dimensions of the discs or parts constituting the various bands which have been slightly varied. It is, however, obvious that the structure and making up of a pile according to the invention, such as explained in regard to FIGS. 3 to 8 as described hereabove, are in no way changed.

More especially, FIG. 9 shows that the discs, parts or plates 17a, 17b, 17c, etc. constituting the band 17 have a width or diameter p slightly smaller than n of discs or parts 18a, 18b constituting the band 18. In a similar way, the said discs, parts or plates constituting band 18 have been chosen so that their width or diameter n is slightly less than that s of the discs, parts or plates 19a, 19b, 19c, etc. of band 19. Due to this special feature, the discs, parts or plates of band 17 are wholly covered by the discs, parts or plates of the two other bands 18 and 19, while discs, parts or plates of band 19 slightly protrude from the stacks or said discs, parts or plates of the two other bands 17 and 18. This feature may be useful in the construction of storage cells in which band 17 is the positive electrode band, band 18 the negative electrode band, and band 19 the separator band. Such a disposition may be advantageous in some cases.

In order to facilitate the manufacture of a storage battery, electrolytic cell or pile according to this disposition, the same distance d (FIG. 9) must be chosen for separating the centers of two successive discs, parts or plates in each of the said bands 17, 18 and 19, i.e. positive electrode, negative electrode and separator.

Thus, if p, n and s (FIG. 9) are the respective widths or diameters of the respective discs, parts or plates constituting the positive electrode, negative electrode and separator bands 17, 18 and 19, they are related by the inequality $$d \geqslant s \geqslant n \geqslant p$$

FIG. 10 is a view of a stack made from the accordion-like folding of bands 17, 18 and 19 described in FIG. 9. The various positions of the discs or parts or plates and of the integral parts or strips of such a stack are clearly seen.

Storage batteries, electrolytic cells or piles are readily made from such a stack in the manner illustrated in said U.S. Patent No. 2,971,999.

FIGS. 11, 12 and 13 show as non-limitative examples, three shapes of bands particularly useful according to the invention.

FIG. 11 shows two straight bands 23 and 24 shaped as ribbons and constituting substantially square parts linked as a straight continuous band. Band 25 is of a constitution similar to that of band 19 hereinabove described. The way of assembling such a pile from the said three bands is exactly similar to the ones hereinabove described.

FIG. 12 shows straight bands 26 and 27 made of parts or plates 26a, 26b, etc. 27a, 27b, etc. respectively having an oval shape and linked respectively by integral parts or strips K and L. Band 28 is seen to be constituted by staggered discs, parts or plates 28b, 28c, etc. quite similar to those of already described band 12, linked by integral parts or strips M.

FIG. 13 shows three continuous bands 29, 30 and constituted by parts or plates each having the shape of a regular octagon. Two of said bands 29 and 30 are straight, whereas band 31 has staggered parts or plates in a way similar to that described for bands 12, 19, 25 and 28. The parts or plates of bands 29 and 30 respectively are linked together by integral strips A and B. The parts or plates of band 31 are linked together by integral strips R. The manners of constructing stacks by accordion-like folding of the bands of FIGS. 11, 12 and 13 and storage batteries, electrolytic cells or piles are, of course, quite similar to those described for FIGURES 2 to 10 inclusive.

Many changes may be made with respect to the described embodiments without departing from the scope of the present invention. Thus, any desired shape may be given to the parts or plates constituting the various bands making the stack.

Thus, also, the staggered band used according to the invention may be preferably but not exclusively used for making separator bands in storage batteries, piles and other electric cells. The material of the separator bands may be those of said U.S. patent, or any separator material presently known and useful for the particular application intended.

It is well understood that the invention is in no way limited to the embodiments described and shown which have only been given as examples.

What is claimed is:

1. A continuous process of preparing a stack of elements of distinct kinds for use in an electric cell, said stack comprising a plurality of superposed elements of three distinct kinds alternated therein, comprising providing three bands each of a distinct kind, each respective band comprising a group of disc-like elements all of the same kind respectively linked together by similar linking parts of the same kind as the elements linked together thereby, the disc-like elements of a first and a second of said bands all being longitudinally aligned in the unfolded condition of such bands, and the disc-like elements of a third of said bands having their disc-like elements staggered in the unfolded condition of said third band, its said disc-like elements extending along a zig-zag line, positioning a first element on each band in its unfolded condition in stacked relationship at a common location with the first element of said staggered third band lying between the first elements of said first and second bands, then folding the linking part between the first and a second element of the staggered band so that the second element of said staggered band overlies the first element of one of the two other bands, then folding the linking part between the first and a second element of the other of said two other bands to overlie the said second element of said staggered band, then folding the linking part between the second and a third element of the staggered band to overlie the second element of said other of said two other bands and thereafter in sequence and in continuity folding linking parts between succeeding elements of said one of said other two bands, said staggered band, said second of said two other bands and said staggered band to complete a stack of elements of said bands in which the elements of said one and said second of said two other bands are disposed in alternation in the stack with an element of said staggered band between each of the adjacent elements of the said other two bands.

2. The process of claim 1 wherein the said linking parts of said third band are orthogonal, substantially equal two by two, the middle points of said last-named linking parts in the unfolded condition of said third band being substantially aligned.

3. The process of claim 1 wherein said linking parts of said third band are all equal to each other in length.

4. The process of claim 1 wherein the elements of said third band in its unfolded condition are staggered between their centers and wherein the elements of the other bands in their unfolded conditions have their centers lying along straight lines, said band whose elements are staggered being of separator material while the elements of the other bands are respectively of positive and negative electrode materials.

5. The process of claim 4 wherein all of said bands in unfolded condition are initially positioned to resemble a star and wherein the respective bands of positive and negative electrode material in such initial positioning provide two rays of said star that make an angle of about 90°.

6. The process of claim 4 including initially arranging all of said bands in unfolded condition as a star, positioning the respective bands of positive and negative electrode material to provide two rays of said star that make an angle of about 90° with each other, and positioning the band whose elements are staggered as a third ray of said star which ray has its main direction parallel to the bisector of the said 90° angle made by said two first-named rays, said band of separator material whose elements are staggered being initially disposed in the outer angle between said two first-named rays which is greater than 180°.

7. The process of claim 1, wehrein the dimensions of the elements of the different continuous bands are varied, the dimensions of the elements of any one band all being alike.

8. The process of claim 1, wherein at least one of said continuous bands is straight in the form of a ribbon having constant width constituting both its element and its common linking part.

9. The process of claim 1, wherein one of said continuous bands is initially in the form of a straight ribbon having a maximum dimensional width $n$ and constitutes a negative electrode band, wherein another of said continuous bands constitutes a separator band having a maximum dimensional width $s$, and wherein another of said continuous bands constitutes a positive electrode band having a maximum dimensional width $p$, the dimensional widths $n$, $s$ and $p$ being related by the inequality.

$$s \geqslant n \geqslant p$$

and wherein the like distance $d$ separating any two centers of adjacent elements of any one of said bands is greater than $s$.

References Cited

UNITED STATES PATENTS 2,745,893    5/1956    Chubb et al.

WINSTON A. DOUGLAS, *Primary Examiner.*

B. J. OHLENDORF, A. SKAPARS,
*Assistant Examiners.*